Figure 1:
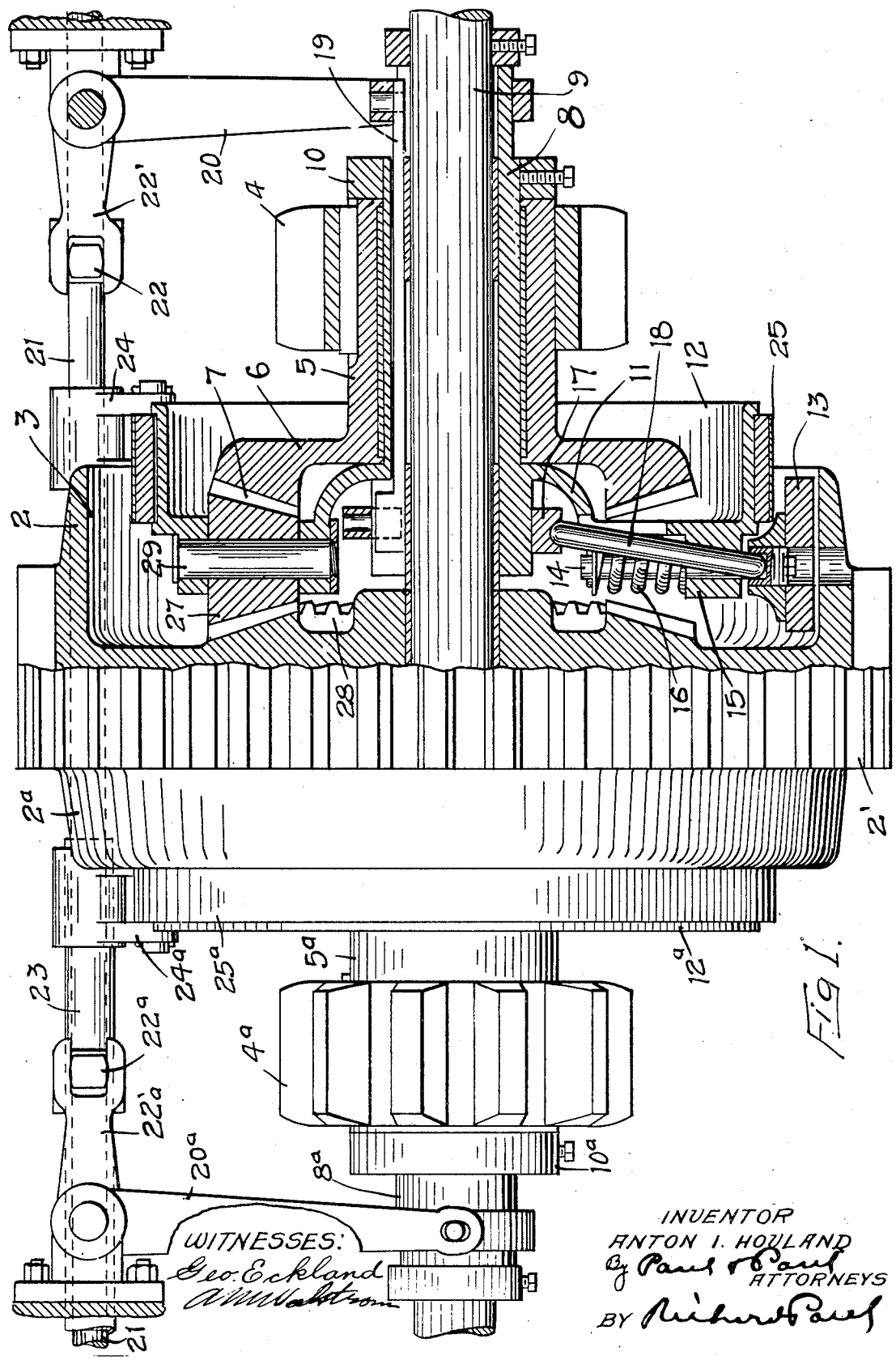

A. I. HOVLAND.
GEARING.
APPLICATION FILED NOV. 12, 1910.

1,024,897.

Patented Apr. 30, 1912.
2 SHEETS—SHEET 1.

INVENTOR
ANTON I. HOVLAND
By Paul & Paul
ATTORNEYS
BY Richard Paul

WITNESSES:
Geo. Eckland
A. M. Walstrom

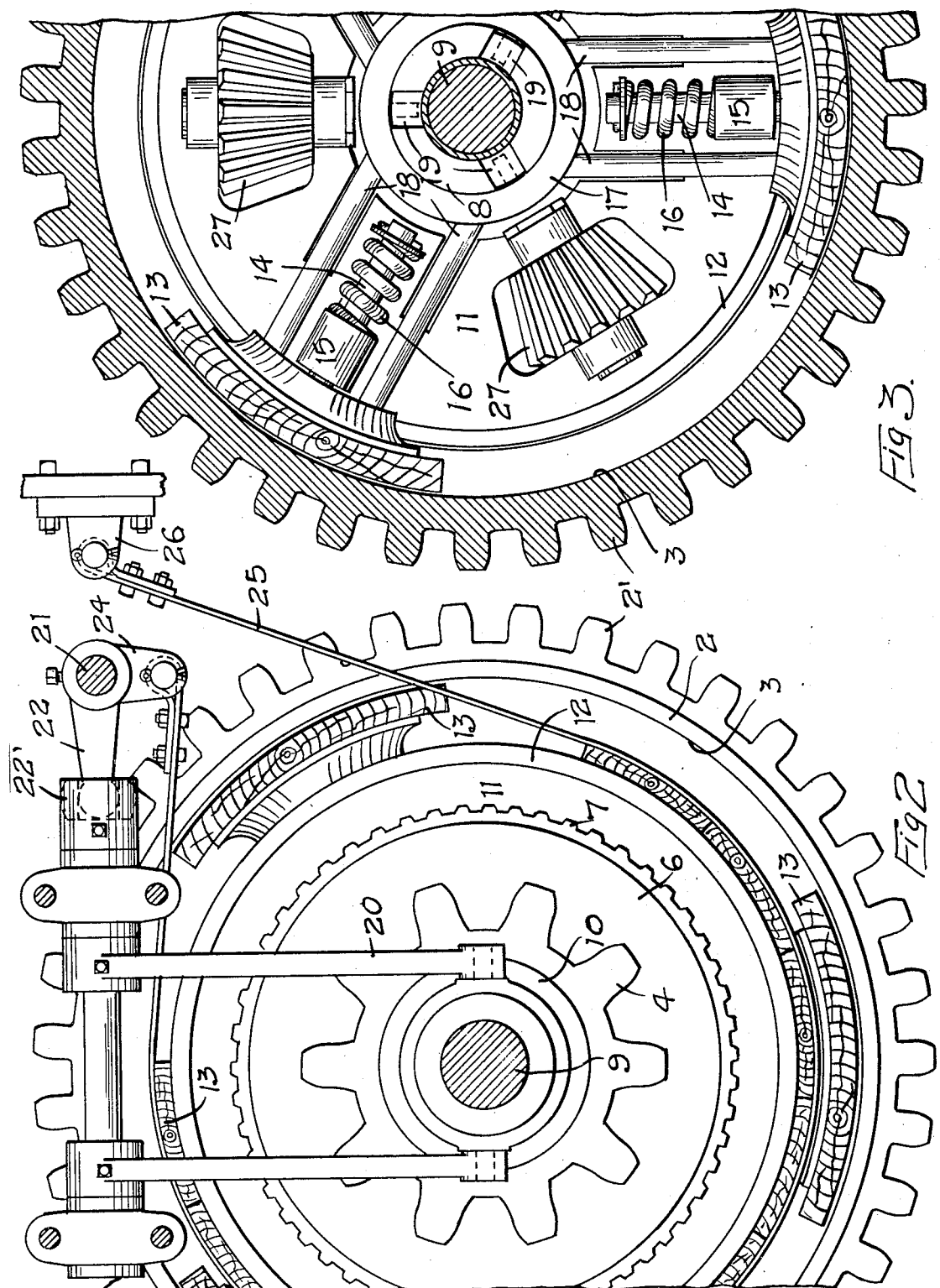

UNITED STATES PATENT OFFICE.

ANTON I. HOVLAND, OF ST. PAUL, MINNESOTA.

GEARING.

1,024,897.   Specification of Letters Patent.   Patented Apr. 30, 1912.

Application filed November 12, 1910. Serial No. 592,110.

*To all whom it may concern:*

Be it known that I, ANTON I. HOVLAND, of St. Paul, Ramsey county, Minnesota, have invented certain new and useful Improvements in Gearing, of which the following is a specification.

The object of my invention is to provide an improved type of gearing by means of which a pinion or other driven member can be operated in one direction and by a simple adjustment of the parts a reversal in the direction of movement of the pinion obtained.

A further object is to provide a gearing mechanism particularly adapted for use with the driving means of a traction wheel belt or shoe, independent driving pinions being employed, either one of which may be driven in one direction while the movement of the other is reversed.

In the accompanying drawings forming part of this specification, Figure 1 is a view, partially in section, illustrating the construction of the gearing, Fig. 2 is a transverse sectional view showing the friction brake mechanism for reversing the direction of movement of the pinion, Fig. 3 is a similar view, illustrating the beveled pinions and the radially moving friction shoes.

In the drawing, 2 represents a gear driven from any suitable source of power. This gear is provided on each side with an annular flange, each flange having an internal friction surface. The flanges and the other mechanism on opposite sides of the gear being the same, I will use the same reference figures for each similar part with the addition of the exponent "a", the flanges being designated by reference numerals 2 and 2$^a$, and the friction surface shown in Fig. 1 being indicated by numeral 3. The pinion 4 is keyed on the hub 5 of a gear 6 having teeth 7. A sleeve 8 is inclosed by the hub 5 and has a bearing on the shaft 9, the hub being held in place by a collar 10. The sleeve 8 is provided with a radial web 11 terminating in an outwardly extending annular flange 12, the outer face of which forms a friction surface. Friction shoes 13 are provided at intervals around the friction surface 3 and are carried by pins 14 which are slidable in guides 15 on the web 11, said pins being held in their retracted position by means of springs 16. A projection of said pins and shoes is effected by means of a sliding ring 17 mounted on the inner end of the sleeve 8 and supporting one end of the pins 18, which bear on said ring and on the friction shoes 13. The ring 17 has sliding arms 19 which extend lengthwise of the shaft 9 between it and the sleeve 8, the reciprocation of the arms 19 causing the ring 17 to move back and forth on its bearings and swing the pins 14 to project the friction shoes into their locking position, or to swing the said pins out of parallel relation with the pins 14 and allow the springs 16 to retract the said shoes. When the shoes 13 are moved outwardly into engagement with their friction surfaces, the sleeve 8 carrying the pinion 4 will be locked and will revolve with the driven gear.

Any suitable means may be provided for operating the clutch mechanism, but I prefer to provide a forked arm 20, the oscillation of this arm operating to move the clutch to its releasing or locking position. The arm 20 is oscillated by a suitable lever mechanism, (not shown) and is connected with a shaft 21 by crank arms 22 and 22', so that when the shaft 21 is rocked, the movement will be imparted to the arm 20. On the other side of the clutch a sleeve 23 is provided inclosing the shaft 21 and having a similar connection with the rocking arm 20$^a$. By the movement of both of these arms simultaneously or separately, if desired, the pinions 4 and 4$^a$ will be locked on their bearings, and power transmitted therethrough to the traction belts, (assuming that the device is used in connection with a traction engine), or to any other suitable driven member.

Upon the shaft 21 a bracket 24 is mounted, attached at one end to a friction brake strap 25 which is secured at its other end to a suitable support 26. When the shaft 21 is rocked in the operation of releasing the friction shoes and the arm 20 is moved past a predetermined point, the strap 25 will be set against the friction surface of the flange 12 and locked thereby, securing the sleeve 8 against revolution. Beveled pinions 27 are interposed between the gear 7 and a similar gear 28 on the driving gear and are mounted upon studs 29 carried by the web 11. When, therefore, this web is locked by the setting of the brake strap 25, the power from the gear 2' will be transmitted through the beveled pinions 27 to the hub 5, revolving it and the pinion 4 in the opposite direction. The pinion on the other side of the clutch may be driven forward so that one friction belt may be operated in one direction and the other in the opposite direction, and the turning of the machine easily and quickly effected. Either pinion may be reversed, according to whichever friction brake strap is set through the mechanism heretofore described.

I do not wish to be confined to the particular construction herein shown and described, as the details thereof are capable of considerable modification without departing from the spirit of my invention.

I claim as my invention:—

1. A gearing comprising a driven gear having a friction surface, a shaft, a sleeve having a bearing on said shaft, friction shoes carried by said sleeve and means for moving them into and out of engagement with said friction surface, and a pinion geared to said sleeve and to said driven gear.

2. A gearing comprising a driven gear having a friction surface, a shaft, a sleeve mounted thereon, friction shoes carried by said sleeve, means for moving said shoes into and out of engagement with said friction surface, said sleeve having a friction brake surface and a brake strap therefor and means for operating the same, a gear, a sprocket pinion secured thereon, and beveled pinions carried by said sleeve and meshing with said gear and while said driven gear, whereby said sprocket pinion may be driven forward or backward.

3. A gearing comprising a driven gear having friction surfaces on each side thereof, a shaft, sleeves having bearings on said shaft on each side of said gear, friction shoes carried by said sleeves and means for moving them into and out of engagement with said friction surfaces, gears mounted on said sleeves on each side of said driven gear, sprocket pinions secured to said gears, and beveled pinions mounted on said sleeve and meshing with said gears and with said driven gear.

4. A gearing comprising a driven gear having friction surfaces on each side thereof, a shaft, sleeves mounted on said shaft on each side of said driven gear, friction shoes carried by said sleeve and means for moving them into and out of engagement with said friction surfaces, said sleeves also having friction brake surfaces and brake straps therefor and means for operating said straps, gears journaled on said sleeves, sprocket pinions secured to said gears, and beveled pinions carried by said sleeves and forming driving connections between said gears and said driven gear, whereby said sprocket pinions may be driven forward by the engagement of said friction shoes with said friction surfaces and backward by releasing said shoes and setting said brake straps.

5. A gearing comprising a driven gear having friction surfaces, a shaft, independent gears journaled on each side of said driven gear, pinions secured to said gears, friction shoes and means for moving them into and out of engagement with said friction surfaces, means operatively connecting said friction shoes with said pinions for driving said pinions in one direction, and means having a driving connection with said gears and said driven gear for reversing the movement of said pinions.

6. A gearing comprising a driven gear, a shaft, gears loosely mounted on each side of said driven gear, sprocket pinions secured to said loosely mounted gears, means operatively connecting said loosely mounted gears with said driven gear for driving both of said sprocket pinions in one direction, and means constructed to reverse the movement of said sprocket pinions or permit the movement of one sprocket pinion in one direction and the other sprocket pinion in the other direction.

7. A gearing comprising a driven gear having friction surfaces on each side thereof, a shaft, sleeves mounted thereon, friction shoes carried by said sleeves, means for moving said shoes toward and from said friction surfaces, loosely mounted gears, pinions secured thereon, idle beveled pinions carried by said sleeves and meshing with said loosely mounted gears and with said driven gear, and means for locking said sleeves against rotation, whereby said pinions may be driven forward or backward simultaneously, or independently of one another.

In witness whereof, I have hereunto set my hand this 9th day of November 1910.

ANTON I. HOVLAND.

Witnesses:
GENEVIEVE E. SORENSEN,
RICHARD PAUL.